INVENTOR
ROBERT M. WARREN, JR.
BY
ATTORNEYS

United States Patent Office 3,433,410
Patented Mar. 18, 1969

3,433,410
REGULATOR
Robert M. Warren, Jr., Lincroft, N.J., assignor to Buensod-Stacey Corporation, New York, N.Y., a corporation of Ohio
Filed Oct. 24, 1965, Ser. No. 504,921
U.S. Cl. 236—13        10 Claims
Int. Cl. G05d 23/00, 27/00

ABSTRACT OF THE DISCLOSURE

An air conditioning arrangement having two constant volume air flow control means, one of which will furnish a preset minimum amount of air and the other of which is thermostatically controlled so as to provide additional air from the preset minimum to a preset maximum.

---

This invention relates to air conditioning systems and particularly to an improved dual volume regulator for dual duct and single duct applications.

In air conditioning systems where air is supplied from a central conditioning device to a plurality of individual distributing units, changing demands for air in the rooms or zones wil cause pressure variations in the air delivery lines with resultant variations in volume flowing therethrough. As an example, where dual duct systems are involved, particularly those operating at high pressures such as described in Patent No. 2,708,568, flow in the warm and cold air ducts may vary over wide ranges in response to demands and such may result in wide variations in pressure in the ducts. Variations in pressure will cause objectionable changes in air distribution, noises, and other undesirable effects, unless the flow is controlled.

The principal object of this invention is to provide an improved air conditioning system in which a dual volume control regulator is employed in dual duct and single duct applications.

Another object of the invention is to provide such a system in which a dual duct system is arranged to operate with variable air delivery within limits set by maximum and minimum volumetric settings.

Still another object of the invention is to provide such a system in which the power required to operate the air handling mechanism during a heating season is reduced.

A further object of the invention is to provide such a system in which appreciably less power is required to operate the air handling equipment between heating and cooling seasons.

A still further object of the invention is to provide such a system which can be used with 100 percent outside air, and in which the demand for refrigeration during a season requiring partial cooling will be greatly reduced.

Another object of the invention is to provide such a system which can be used with 100 percent outside air, and in which the necessity of heating excess outside air during a heating season will be eliminated.

Still another object of the invention is to provide such a system in which field balancing will be eliminated for maximum and minimum cubic feet per minute to be handled by each unit.

In one aspect of the invention, an air circulating dual duct system may comprise a mixing valve having cold and warm air inlets, with a pivoted damper between them for varying the proportion of cold and warm air exiting from the mixing valve.

In another aspect of the invention, the outlet of the mixing valve may be connected to a mixing chamber in which may be located two separately operable air flow regulators, the output from said regulators passing through duct means to the room or zone being conditioned.

A further object of the invention is to provide such a system which will derive the maximum amount of dehumidification, within the limits of available refrigeration, during partial cooling by virtue of reduction of recirculated air quantity.

In a further aspect of the invention, one of the flow regulators may be manually preset so that when the other is closed, a minimum flow of mixed or supply air will pass through the duct work to the room or zone being conditioned and the other flow regulator will supply additional air in accordance with a thermostatic control, the additional air being between the minimum of the first control and the maximum of the second control.

In a still further aspect of the invention, the other flow regulator may be power operated to vary the flow of air through it.

In still another aspect of the invention, the power controlled regulator and the power operated mixing valve may be operated in a sequential manner from a control responsive to the conditions in the room or zone being treated, either by a direct or reversing acting thermostatic device.

In another aspect of the invention, the mixing valve may be omitted and conditioned air or 100 percent outside air may be supplied directly to the mixing chamber including the manually preset flow regulator and the power operated flow regulator.

In a still further aspect of the invention, such a system may be provided in which the volume of air supplied to the room or zone may be reduced from a preset maximum to a preset minimum in conformance with load changes. Thus, when the temperature decreased such that the cooling load dropped off, the power operated regulator would close, thereby reducing the total air supplied to that passing through the preset flow regulator, i.e., a preset minimum.

In a further aspect of the invention, a reheat or cooling coil could be included as a terminal part of the mixing chamber, if required.

The above, other objects and novel features of the improved dual regulator system of air conditioning will become apparent from the following specification and accompanying drawings which are merely exemplary.

Figure 1:
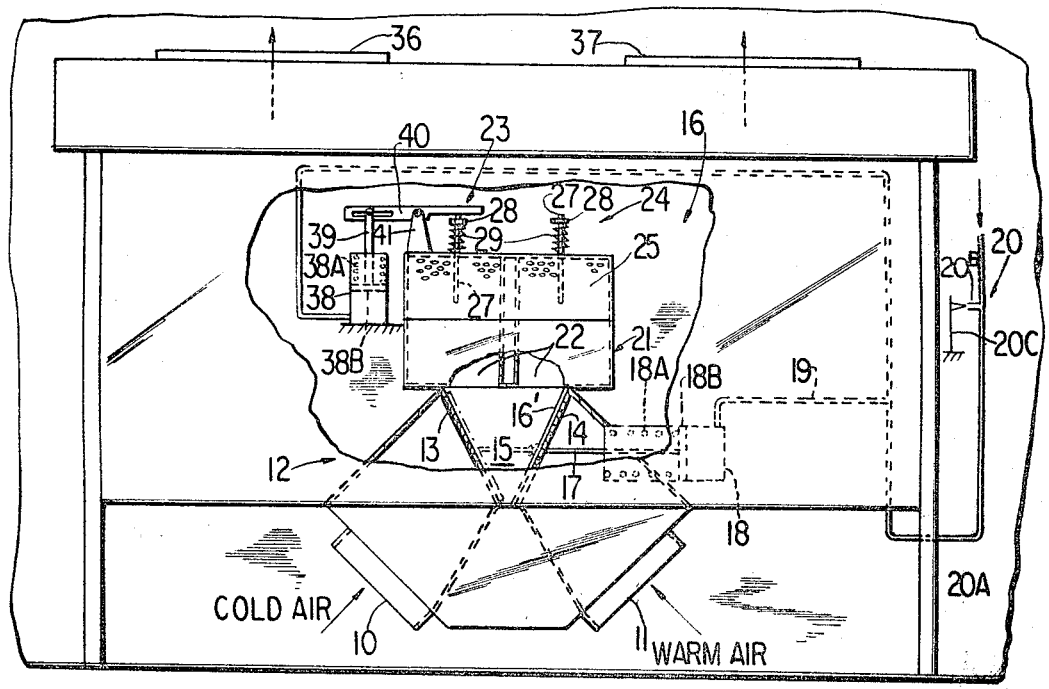
FIG. 1 is a portion of an air conditioning system to which the principles of the invention have been applied.
Figure 2:
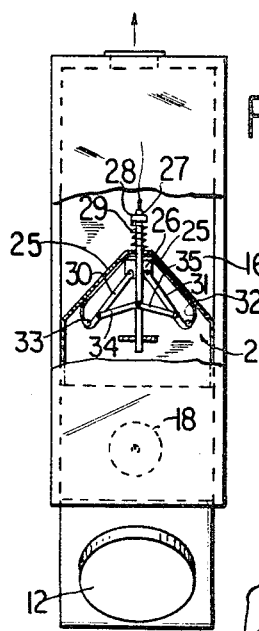
FIG. 2 is a sectional elevational view taken substantially along line 2—2 of FIG. 1.
Figure 4:
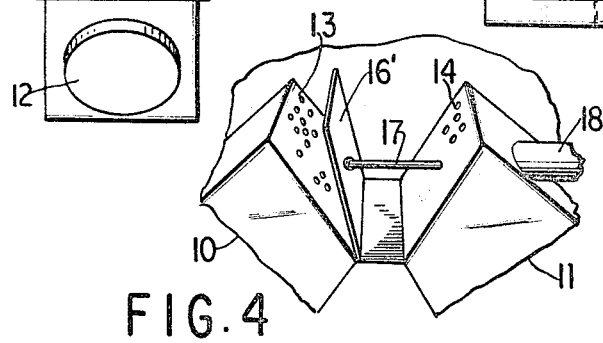
FIG. 4 is a perspective view of a portion of the mixing valve shown in FIG. 1.

Referring to the drawings, and particularly to FIGS. 1, 2 and 4, the principles of the invention are shown as applied to an air conditioning system including dual ducts 10 and 11 leading to a mixing valve 12. Duct 10 may supply outside cold air to valve 12, while duct 11 may supply heated air to valve 12. The valve 12 may be of rectangular cross section, its terminal ends 13 and 14 being arranged to form a V-shaped space 15 therebetween within a mixing chamber 16. The ends 13 and 14 may be provided with perforated plates through which the air passes.

A damper 16′ may be pivotally supported at the crotch of the V-shaped space, and it may have fixed to it a piston rod 17 that passes through an opening in plate 14 and extends into a cylinder 18. A spring 18A within cylinder 18 normally urges a piston 18B therein in a direction opening cold air duct 10 and closing warm air duct 11. Cylinder 18 is supplied with pressure air from a line 19 under the control of a thermostatic valve 20 within the room or zone being conditioned. The strength of spring 18A may, purely as an example, be such as to be compressed by air pressure in cylinder 18 of between about 10 to 15 pounds per square inch.

Referring to FIG. 1, a housing 21 is mounted on top of the terminal ends 13, 14 so that the air leaving mixing valve 12 passes into housing 21 through opening 22 therein. Constant volume air flow regulators 23 and 24 are mounted in housing 21 for controlling the flow of mixed air from valve 12 to the mixing chamber 16.

Referring to FIG. 2, each of the regulators 23, 24 may be substantially the same as the regulator shown, described and claimed in U.S. Patent 2,890,716, granted to E. A. Werder on June 16, 1959. They may include inclined, perforated portions 25 that are connected together by a block 26 through which slidingly extends a rod 27 having a nut 28 threaded thereon, and between which nut and the top of the portion 25 a spring 29 is compressed, normally forcing rod 27 upwardly.

Links 30 and 31 may be pivoted at their upper ends to block 26, and their lower ends may be connected to the lower ends of flexible curtain means 32, 33, the upper ends of which are anchored to block 26. Other links 34, 35 may have their outer ends pivoted to links 30, 31, respectively, and their inner ends pivoted to rod 27.

By varying the compression of spring 29, the vertical position of rod 27 can be arranged for a given flow of air through the perforated portions 25. An increase in pressure, upstream, causes a greater portion of the curtain means 32, 33 to lie over a greater portion of the perforated portions 25. This action regulates the flow of air through the regulators 23, 24.

The regulator 24 is adapted to be manually preset by adjusting nut 28 on rod 27 to provide a preset minimum of air flow into mixing chamber 16 from which it exits to duct means (not shown) through outlets 36, 37 leading from mixing chamber 16.

The action of regulator 23 is adapted to be governed by pneumatic means under the control of the thermostatic valve 20 that is responsive to conditions within the room or zone being conditioned. To accomplish this, a cylinder 38 is mounted on the side of housing 21. Its piston rod 39 is connected to a link 40 that is pivoted to a support 41. The end of link 40 opposite that connected to rod 39 acts on the top of rod 27, and a spring 38A in cylinder 38 acts on a piston 38B, tending to lift lever 40 off rod 27 so that spring 29 controls the position of curtain means 32, 33. The spring 38A is weaker than spring 18A and may be such that a force of 5 to 10 pounds per square inch in cylinder 38 compresses it.

In the species of FIG. 1, the operation of the damper 16′ and curtain means 32, 33 is such that minimum air flows to the room or zone being conditioned through the preset flow regulator 24, and variations in upstream pressure actuate the curtain means thereof to maintain substantially constant this minimum flow of air. As the temperature falls in the room or zone to be conditioned, the flapper valve 20C moves clockwise toward bleeder nozzle 20B, increasing the pressure of air from line 20A which first acts on piston 38B moving it upwardly and rod 27 downwardly so as to first close off regulator 23, the curtain of the volume regulator moving against the perforated plates because of air flow. Thus, flow of cold air will be reduced. Upon further decrease in temperature in the room, the thermostat 20C will move so as to cause further increase in control pressure which will then act on piston 18B and move the valve 16′ towards the cold air duct from the position shown in FIG. 1 until it closes the same, warm air then being fed through volume regulator 24 which is set at a predetermined minimum. Thus, there will be control between the maximum amount of cold air with both constant volume regulators operating to supply maximum cold air to a preset minimum of warm air.

Figure 3:
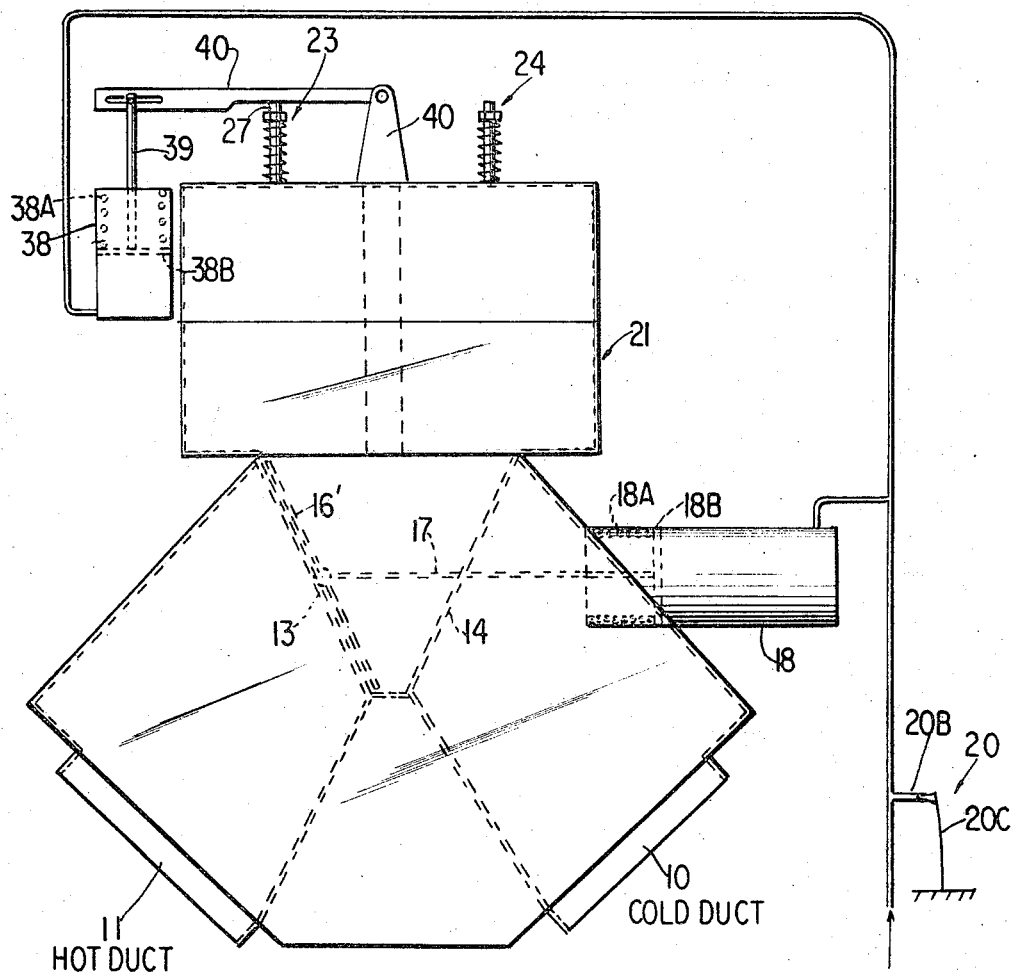
FIG. 3 is a modified form of the apparatus shown in FIG. 1.

Referring to FIG. 3, an oppositely acting thermostatic bleeder valve or thermostat 20 is employed. In this species the spring 18A is weaker than spring 38A, spring 18A being 5 to 10 pounds and spring 38A being 10 to 15 pounds. Rising control pressure upon increase in temperature in the zone will first open up the cold air by moving piston 18B and thereafter moving piston 38B upwardly and rod 27 upwardly to open regulator 23.

Figure 5:
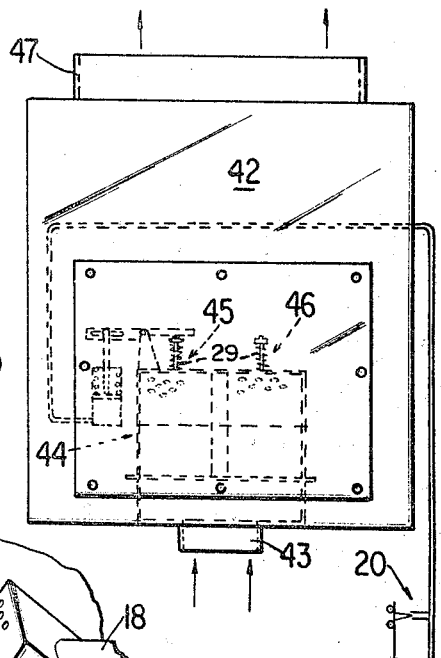
FIG. 5 is a view of a modified form of the invention.

Referring to FIG. 5, the principles of the invention are shown as applied to a single duct arrangement. In this embodiment, a mixing chamber 42 includes a single duct inlet 43 that supplies 100 percent outside air to the apparatus. A housing 44 within chamber 42 may support two separately controlled air flow regulators 45, 46, identical with regulators 23 and 24. An air heating or cooling unit 47 may be mounted at the exit of chamber 42 if required. The regulator 46 of the embodiment of FIG. 4 is manually preset in the same way that regulator 24 is preset, i.e., for the passage of a satisfactory minimum of air to the zone or room being conditioned. Regulator 45 is controlled in the same manner that regulator 24 is controlled, i.e., by a thermostatic valve that is responsive to room or zone conditions. This arrangement provides a means for reducing the volume of air supply from a preset maximum to a preset minimum in conformance with load changes.

Although the various features of the improved air conditioning system have been shown and described in detail to fully disclose two embodiments of the invention, it will be evident that changes may be made in such details and certain features may be used without others without departing from the principles of the invention.

What is claimed is:

1. In an air conditioning system for conditioning a zone or room, the combination comprising a chamber; exit means leading from said chamber adapted to be connected to the room or zone being conditioned; a housing within said chamber having an inlet connected to an air supply, and an outlet means opening into said chamber; separate constant air volume regulators within said chamber and connected to said outlet means, one of said regulators being manually preset to pass a predetermined quantity of air to said chamber, and the other of said regulators being power operated for controlling the flow of air therethrough to said chamber, said regulators being responsive to upstream pressure fluctuations in said air supply leading to said regulators; and means responsive to the condition of said room or zone for controlling said power operated regulator.

2. In an air conditioning system for conditioning a zone or room, the combination comprising a chamber; exit means leading from said chamber adapted to be connected to the room or zone being conditioned; a housing within said chamber having an inlet connected to an air supply, and an outlet means opening into said chamber; separate constant air volume regulators within said chamber and connected to said outlet means, one of said regulators being manually preset to pass a predetermined quantity of air to said chamber, and the other of said regulators being power operated for controlling the flow of air therethrough to said chamber, said regulators being responsive to upstream pressure fluctuations in said air supply leading to said regulators; and means responsive to the condition of said room or zone for controlling said power operated regulator.

3. In an air conditioning system for conditioning a zone or room, the combination comprising a chamber; exit means leading from said chamber adapted to be connected to the room or zone being conditioned; a housing within said chamber having an inlet connected to an air supply, and an outlet means opening into said chamber; separate constant air volume regulators within said chamber and connected to said outlet means, one of said regulators being manually preset to pass a predetermined quantity of air to said chamber, and the other of said regulators being power operated between open and closed positions for controlling the flow of air therethrough to said chamber, said regulators being responsive to upstream pressure fluctuations in said air supply leading to said regulators; and means responsive to the condition of said room or zone for controlling said power operated regulator.

4. In an air conditioning system for conditioning a zone or room, the combination comprising a mixing chamber; exit means leading from said chamber adapted to be connected to duct means leading to said room or zone to be conditioned; a housing within said mixing chamber; hot and cold air inlet means connected to a mixing valve, the outlet therefrom being connected to the inlet to said housing; separate air volume regulators within said housing, one of said regulators being adapted to be manually preset to pass a predetermined quantity of air to said mixing chamber, and the other of said regulators being power operated for controlling the flow of air therethrough to said mixing chamber; power operated means for operating said mixing valve; and means responsive to the condition of said room or zone for controlling both of said power operated means.

5. In an air conditioning system for conditioning a zone or room, the combination comprising a mixing chamber; exit means leading from said chamber adapted to be connected to duct means leading to said room or zone to be conditioned; a housing within said mixing chamber; hot and cold air inlet means connected to a mixing valve, the outlet therefrom being connected to the inlet to said housing; separate air volume regulators within said housing, one of said regulators being adapted to be manually preset to pass a predetermined quantity of air to said mixing chamber, and the other of said regulators being power operated for controlling the flow of air therethrough to said mixing chamber; power operated means for operating said mixing valve; and means responsive to the condition of said room or zone for sequentially operating both of said power operated means.

6. In an air conditioning system for conditioning a zone or room, the combination comprising a mixing chamber; exit means leading from said chamber adapted to be connected to duct means leading to said room or zone to be conditioned; a housing within said mixing chamber; hot and cold air inlet means connected to a mixing valve, the outlet therefrom being connected to the inlet to said housing; separate air volume regulators within said housing, one of said regulators being adapted to be manually preset to pass a predetermined quantity of air to said mixing chamber, and the other of said regulators being power operated for controlling the flow of air therethrough to said mixing chamber, said regulators being responsive to upstream pressure fluctuations; power operated means for operating said mixing valve; and means responsive to the condition of said room or zone for controlling both of said power operated means.

7. In an air conditioning system for conditioning a zone or room, the combination comprising a mixing chamber; exit means leading from said chamber adapted to be connected to duct means leading to said room or zone to be conditioned; a housing within said mixing chamber; hot and cold air inlet means connected to a mixing valve, the outlet therefrom being connected to the inlet to said housing; separate air volume regulators within said housing, one of said regulators being adapted to be manually preset to pass a predetermined minimum quantity of air to said mixing chamber, and the other of said regulators being power operated for controlling the flow of air therethrough to said mixing chamber; power operated means for operating said mixing valve; and means responsive to the conditioning of said room or zone for controlling both of said power operated means.

8. In an air conditioning system for conditioning a zone or room, the combination comprising a mixing chamber; exit means leading from said chamber adapted to be connected to duct means leading to said room or zone to be conditioned; a housing within said mixing chamber; hot and cold air inlet means connected to a mixing valve, the outlet therefrom being connected to the inlet to said housing; separate air volume regulators within said housing, one of said regulators being adapted to be manually preset to pass a predetermined minimum quantity of air to said mixing chamber, and the other of said regulators being power operated between open and closed positions for controlling the flow of air therethrough to said mixing chamber; power operated means for operating said mixing valve; and means responsive to the condition of said room or zone for controlling both of said power operated means.

9. In an air conditioning system for conditioning a zone or room, the combination comprising a chamber; exit means leading from said chamber adapted to be connected to the room or zone being conditioned; a housing within said chamber having an inlet connected to a single air supply means, and an outlet means opening into said chamber; separate constant air volume regulators within said chamber connected to said outlet means, one of said regulators being manually preset to pass a predetermined quantity of air to said chamber, and the other of said regulators being power operated for controlling the flow of air therethrough to said chamber, said regulators being responsive to upstream pressure in said air supply leading to said regulators; and means responsive to the condition of said room or zone for controlling said power operated regulator.

10. In an air conditioning system for conditioning a zone or room, the combination comprising a chamber; exit means leading from said chamber adapted to be connected to the room or zone being conditioned; a housing within said chamber having an inlet connected to a single air supply means, and an outlet means opening into said chamber; separate constant air volume regulators within said chamber and connected to said outlet means, one of said regulators being manually preset to pass a predetermined quantity of air to said chamber, and the other of said regulators being power operated for controlling the flow of air therethrough to said chamber, said regulators being responsive to upstream pressure in said air supply leading to said regulators; means responsive to the condition of said room or zone for controlling said power operated regulator; and means attached to said chamber for heat exchange with the air exiting therefrom.

References Cited

UNITED STATES PATENTS

| 2,844,322 | 7/1958 | Kautz | 236—13 |
| 2,957,628 | 10/1960 | Curran | 236—13 |
| 2,991,937 | 7/1961 | Bottorf | 236—13 |
| 3,179,338 | 4/1965 | Ostrander | 236—13 |
| 2,067,426 | 1/1937 | Stuart | 236—11 |
| 2,428,078 | 9/1947 | Heymann | 236—11 X |
| 2,890,716 | 6/1959 | Werder. | |

EDWARD J. MICHAEL, *Primary Examiner.*

U.S. Cl. X.R.

236—92

UNITED STATES PATENT OFFICE
CERTIFICATE OF CORRECTION

Patent No. 3,433,410                                                                March 18, 1969

Robert M. Warren, Jr.

It is certified that error appears in the above identified patent and that said Letters Patent are hereby corrected as shown below:

Column 1, line 25, "wil" should read -- will --. Column 4, line 62, before "quantity" insert -- minimum --. Column 6, line 4, "conditioning" should read -- condition --.

Signed and sealed this 7th day of April 1970.

(SEAL)
Attest:

Edward M. Fletcher, Jr.                                WILLIAM E. SCHUYLER, JR.
Attesting Officer                                                   Commissioner of Patents